US008121466B2

(12) United States Patent
Reusche et al.

(10) Patent No.: US 8,121,466 B2
(45) Date of Patent: Feb. 21, 2012

(54) DEICER ANCHORING SYSTEM

(75) Inventors: Thomas K. Reusche, Elburn, IL (US);
Philip E. Chumbley, Aurora, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 430 days.

(21) Appl. No.: 12/480,449

(22) Filed: Jun. 8, 2009

(65) Prior Publication Data

US 2009/0314787 A1 Dec. 24, 2009

Related U.S. Application Data

(60) Provisional application No. 61/074,093, filed on Jun. 19, 2008.

(51) Int. Cl.
*H05B 3/80* (2006.01)

(52) U.S. Cl. ........ 392/499; 392/497; 392/441; 392/448; 392/455; 392/459

(58) Field of Classification Search .............. 392/499, 392/441, 448, 455, 459
See application file for complete search history.

(56) References Cited

U.S. PATENT DOCUMENTS

| | | | | |
|---|---|---|---|---|
| 2,133,388 A * | 10/1938 | Henderson | | 119/73 |
| 2,430,272 A * | 11/1947 | Brodie | | 119/73 |
| 2,472,178 A * | 6/1949 | Temple | | 392/499 |
| 2,480,053 A * | 8/1949 | Schubert | | 392/448 |
| 2,514,559 A * | 7/1950 | Riemenschneider | | 392/499 |
| 2,899,533 A * | 8/1959 | Farmer | | 392/497 |
| 3,212,494 A * | 10/1965 | Stapleton | | 126/374.1 |
| 3,431,394 A * | 3/1969 | Hopper | | 392/471 |
| 3,476,915 A * | 11/1969 | Rapsis | | 219/523 |
| 3,596,295 A * | 8/1971 | Wilson | | 4/493 |
| 3,673,386 A * | 6/1972 | Drugmand et al. | | 219/523 |
| 4,068,116 A * | 1/1978 | McKinstry | | 219/523 |
| 4,510,920 A * | 4/1985 | Walmet | | 126/561 |
| 4,599,973 A * | 7/1986 | Ward | | 119/73 |
| 5,235,161 A * | 8/1993 | Reusche et al. | | 219/523 |
| 5,431,148 A * | 7/1995 | Kronberg | | 126/564 |
| 5,828,810 A * | 10/1998 | Frank et al. | | 392/502 |
| 5,983,889 A * | 11/1999 | Thomas | | 126/351.1 |
| 6,151,448 A * | 11/2000 | Reusche et al. | | 392/501 |
| 6,227,132 B1 * | 5/2001 | Garcia | | 114/197 |
| 6,810,206 B1 * | 10/2004 | Clark, Jr. | | 392/501 |
| 7,853,133 B2 * | 12/2010 | Reusche et al. | | 392/499 |
| 2004/0151485 A1 * | 8/2004 | Reusche et al. | | 392/499 |
| 2005/0279010 A1 * | 12/2005 | Krog | | 43/44.87 |
| 2008/0002955 A1 | 1/2008 | Reusche | | |
| 2011/0094025 A1 * | 4/2011 | West | | 4/506 |

* cited by examiner

*Primary Examiner* — Thor Campbell

(57) ABSTRACT

A system for preventing a deicer from being removed from a liquid receptacle includes a deicer, an anchoring assembly and a tether. The deicer includes a main body and a heating element. The heating element is configured to heat liquid within the liquid receptacle. The anchoring assembly is configured to be secured to or within the liquid receptacle. The tether has first and second ends. The first end is securely fastened to a portion of the deicer. The second end is securely fastened to the anchoring assembly. The anchoring assembly is configured to ensure that the deicer remains within the liquid receptacle.

20 Claims, 2 Drawing Sheets

US 8,121,466 B2

DEICER ANCHORING SYSTEM

RELATED APPLICATIONS

The present application relates to and claims priority from U.S. Provisional Application No. 61/074,093, entitled "Restraint For Stock Tank Deicer," filed Jun. 19, 2008, which is hereby incorporated by reference in its entirety.

FIELD OF THE INVENTION

Embodiments of the present invention generally relate to a deicing system, and more particularly to a system for anchoring a deicer within a fluid receptacle, such as a livestock water tank.

BACKGROUND OF THE INVENTION

Electric deicers have been used in livestock water tanks to keep ice from forming during winter months. If deicers were not used, ice would form in the water tanks, thereby preventing livestock from drinking the water within the tanks.

Conventional electric water deicers are used to keep areas of livestock water tanks and ponds free from ice during winter months. Similarly, birdbath deicers and heated birdbaths or pet bowls are used for smaller animals. One type of deicer is a floating deicer in which a buoyant member such as a buoyant ring is attached to a heating element so that the deicer may float on the surface of the water. Another type of deicer is a sinking deicer that is configured to lay at the bottom of a tank or pond, or on a metal guard submerged in the tank. Deicing systems are shown and described in U.S. patent application Ser. No. 12/235,761, entitled "Deicing System and Method," filed Sep. 23, 2008, which is hereby incorporated by reference in its entirety.

Generally, deicers are plugged into an electrical outlet and then placed into water. With both floating deicers and sinking deicers, the insulated electrical cord is draped over a side of the tank where it is exposed to livestock.

Many animals are, however, inquisitive and tend to play, or otherwise interfere with, an object that extends above the water surface. Horses, in particular, often use their teeth to pull objects from water tanks. In some instances, livestock pull a deicer from a water tank, thereby presenting a dangerous situation in which a heating element of the deicer becomes extremely hot when not immersed in water.

In recent years, deicers designed to be mounted in a drain hole of a water tank have been used. A drain plug deicer operates similar to a sinking deicer. The electrical cord for a drain plug deicer is completely outside the tank where it can be routed to prevent encounters with livestock. However, a water tank must first be emptied of water in order to install or remove a drain plug deicer. Additionally, if a drain plug deicer becomes inoperable, it is difficult to remove from a water tank in freezing temperatures due to the fact that ice forms around it, thereby freezing it in position.

SUMMARY OF THE INVENTION

Certain embodiments of the present invention provide a system for preventing a deicer from being removed from a liquid receptacle, such as a livestock water tank. The system includes a deicer, such as a floating or sinking deicer, including a main body and a heating element. The heating element is configured to heat liquid within the liquid receptacle.

The system also includes an anchoring assembly configured to be secured to or within the liquid receptacle. A tether having first and second ends secures the deicer to the anchoring assembly. The first end is securely fastened to a portion of the deicer (e.g., through tying the first end to a portion of the deicer). The second end is securely fastened to the anchoring assembly (e.g., through tying the second end to the anchoring assembly). The anchoring assembly is configured to ensure that the deicer remains within the liquid receptacle. Consequently, the deicer is prevented from being removed from the liquid receptacle, such as by a horse biting the deicer and throwing it from the receptacle.

The anchoring assembly may include a drain plug configured to plug a drain of the liquid receptacle. The drain plug may be configured to threadably secure to a wall of the liquid receptacle that defines the drain. An eye bolt may be secured to the drain plug. The second end of the tether may be securely tied to the eye bolt.

Optionally, a bolt having a through-hole formed through a shaft may be used, such that the bolt is secured to the drain plug. The second end of the tether may be looped through the through-hole.

A wing nut may threadably engage the shaft. The wing nut may be configured to cover a portion of the through-hole in order to securely pinch the second end of the tether within the through-hole.

The tether may be formed of stainless steel braid, aluminum wire, plastic cable or monofilament.

Figure 1:
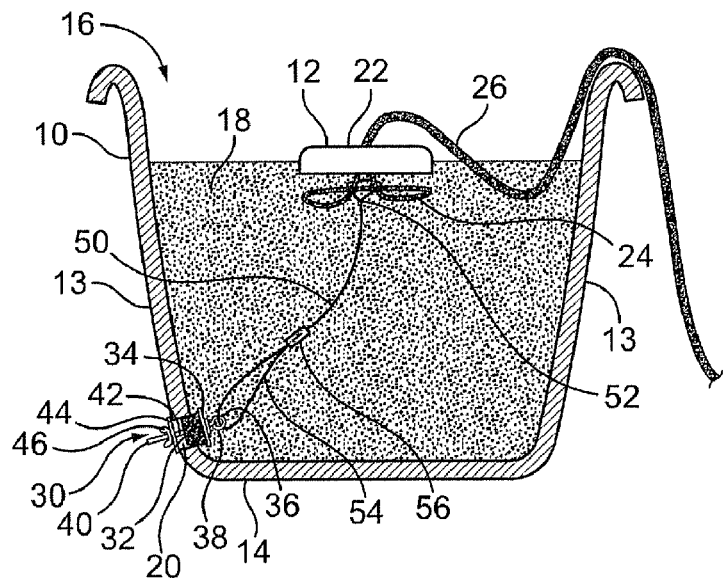
FIG. 1 illustrates a cross-sectional view of a liquid receptacle with a floating deicer contained therein, according to an embodiment of the present invention.

The foregoing summary, as well as the following detailed description of certain embodiments of the present invention, will be better understood when read in conjunction with the appended drawings. For the purpose of illustrating the invention, there are shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates a cross-sectional view of a liquid receptacle 10, such as a livestock water tank, with a floating deicer 12 contained therein, according to an embodiment of the present invention. The liquid receptacle 10 includes upstanding walls 13 integrally connected to a base 14, thereby defining a liquid retaining volume 16 therebetween. The receptacle 10 contains liquid 18, such as water, within the liquid retaining volume 16.

A drain 20 is positioned through the wall 13 proximate the base 14. In order to retain water, the drain 20 is plugged. When the receptacle 10 is to be drained, the plug is removed in order to allow liquid to pass out of the receptacle 10.

In order to keep ice from forming within the receptacle 10, the deicer 12 is used to heat the water 18. The deicer 12 includes a main body 22, which may include or be formed of a buoyant material. A heating element 24 extends from the main body 22 and is operably connected to a source of electrical power through an insulated electrical cord 26 that drapes over an upper edge of a wall 13.

The deicer 12 is prevented from being removed from the water 18 through an anchoring assembly 30. The anchoring assembly 30 includes a liquid tight drain plug 32 (which may be formed of rubber) that is positioned within the drain 20. A washer 34 is secured to an expanded end of the drain plug 32 by way of an eye bolt 36 passing through a central opening (not shown) of the washer 34 and through a central passage (not shown) that passes through the length of the drain plug 32. The eye bolt 36 includes a loop end 38 that is integrally connected to a distal end 40 through a shaft 42. The shaft 42 passes through the drain plug 32 and the drain 20. Another washer 44 mounts over the drain 20 such that the distal end 40 of the eye bolt 36 passes through a central opening (not shown) of the washer 44. A wing nut 46 threadably engages the shaft 42 and is used to securely compress the washer 34 into the drain plug 32 and securely compress the washer 44 into edges of the wall 13 that define the drain 20.

A tether 50 secures the deicer 12 to the anchoring assembly 30. The tether 50 may be formed of stainless steel braid, aluminum wire, plastic cable, monofilament or any other such substance that provides sufficient tensile strength while resisting water corrosion. The tether 50 includes an end 52 securely attached to a portion of the deicer 12, such as the main body 22 or a hook or loop extending therefrom. For example, the end 52 may be tied to a loop extending from the deicer 12, or around a coil of the heating element. Another end 54 of the tether 50 is looped through an opening formed through the loop end 38 of the eye bolt 36. The end 54 is looped and tied to a portion of the tether 50 (such as through forming a knot), thereby providing a secure connection to the eye bolt 36. An adjustment slider 56 may be slidably secured on the tether 50. The adjustment slider 56 may be adjusted to remove slack in the tether 50.

As explained above, the deicer 12 is securely anchored to the receptacle 10 through the tether 50 securing to the anchoring assembly 30. Consequently, livestock are unable to remove the deicer 12 from the receptacle 10.

While the anchoring assembly 30 is shown used with the floating deicer 12, the anchoring assembly 30 may be used with various other types of deicers. For example, the anchoring assembly 30 may be secured to a sinking deicer through the tether 50.

Figure 2:
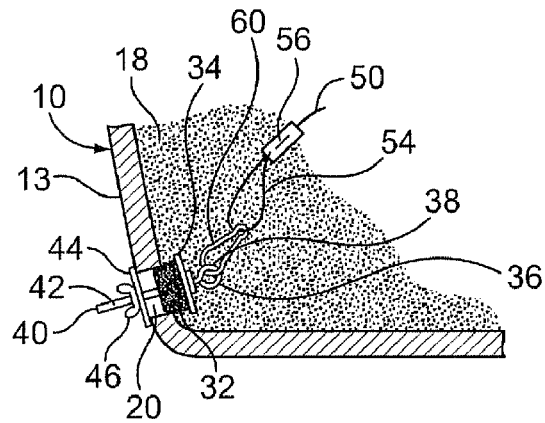
FIG. 2 illustrates a lateral view of a deicer anchoring assembly within a liquid receptacle, according to an embodiment of the present invention.

FIG. 2 illustrates a lateral view of the deicer anchoring assembly 30 within the liquid receptacle 10, according to an embodiment of the present invention. This embodiment is similar to the above, except that, instead of the end 54 of the tether 50 being looped through the loop end 38 of the eye bolt 36, a clip 60 is used to secure the end 54 to the loop end 38. The clip 60 may be a flexible spring member that may be opened when sufficient force is applied (such as through an individual squeezing the clip 60 together).

Figure 3:
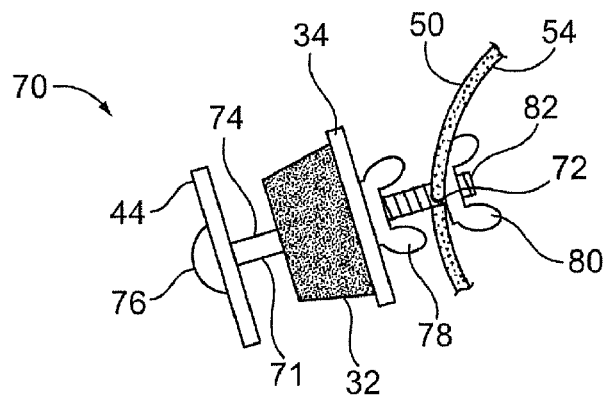
FIG. 3 illustrates a lateral view of a deicer anchoring assembly, according to an embodiment of the present invention.

FIG. 3 illustrates a lateral view of a deicer anchoring assembly 70, according to an embodiment of the present invention. The anchoring assembly 70 is similar to that described above in FIG. 1, except that, instead of using an eyebolt, a threaded bolt 71 having a through-hole 72 passing through the shaft 74 (in a direction perpendicular to the longitudinal axis of the bolt 71) is used to securely retain the end 54 of the tether 50.

An expanded head 76 of the bolt 71 compresses into the washer 44, and a wing nut 78 is used to compress the washer 34 into the expanded end of the drain plug 32. The loop end 54 of the tether passes through the through-hole 72, thereby securing the tether 50 to the anchoring assembly 70. An additional wing nut 80 may threadably secure over a distal end 82 of the bolt 71. The wing nut 80 may be rotated into position so that it is over at least a portion of the through-hole 72, thereby securely pinching the loop end 54 within the through-hole 72.

Figure 4:
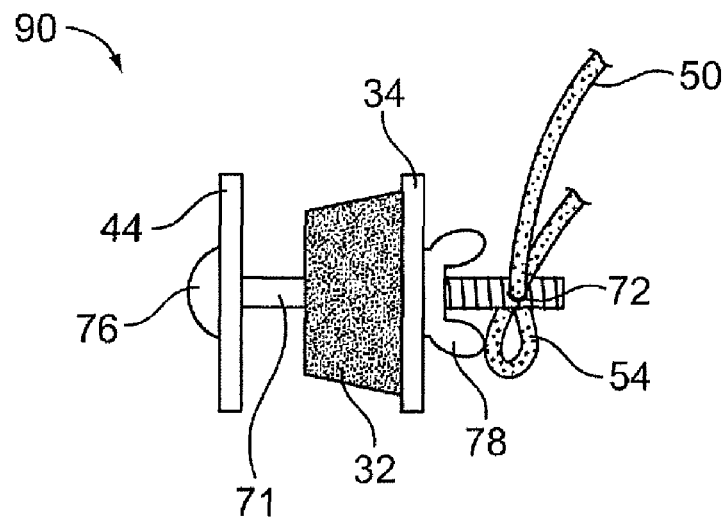
FIG. 4 illustrates a lateral view of a deicer anchoring assembly, according to an embodiment of the present invention.

FIG. 4 illustrates a lateral view of a deicer anchoring assembly 90, according to an embodiment of the present invention. The anchoring assembly 90 is similar to that shown in FIG. 3, except that instead of using an additional wing nut, the loop end 54 of the tether 50 is merely double-backed through the through-hole 72, thereby securely lodging the loop end 54 therein. The tension exerted on the tether 50 by way of the loop end 54 being double-backed into the through-hole 72 secures the loop end 54 in place due to the stiffness of the tether 50 itself.

Figure 5:
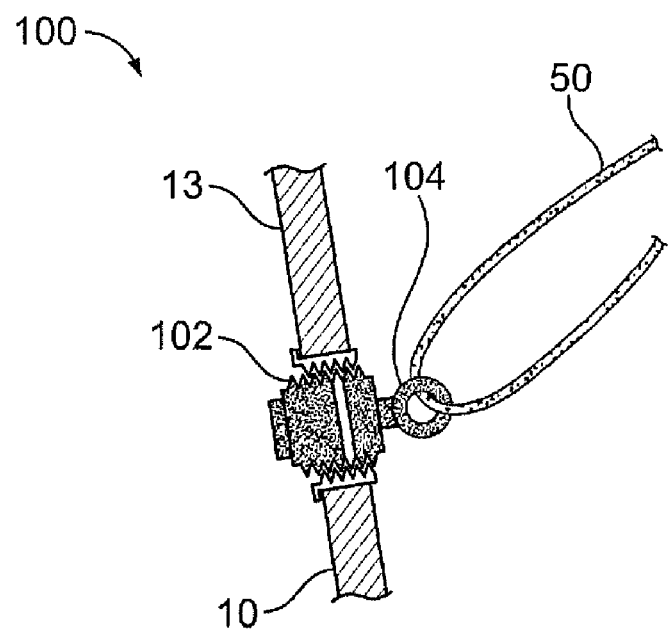
FIG. 5 illustrates a lateral view of a deicer anchoring assembly, according to an embodiment of the present invention.

FIG. 5 illustrates a lateral view of a deicer anchoring assembly 100, according to an embodiment of the present invention. In this embodiment, the drain plug 102 is threadably secured into the wall 13 of the receptacle 10. A rigid loop 104, such as a loop end of an eyebolt, extends from the drain plug 102 into the liquid retaining chamber. The tether 50 secures to the loop 104, such as discussed above in FIG. 1. Alternatively, any of the other securing members discussed in FIGS. 2-4 may be used to secure the tether 50 to the drain plug 102.

In all of the embodiments described above, the length of the tether 50 is configured, or slidably adjusted (such as through the slider 56), so that the deicer 12 cannot be raised above the top of the receptacle 10. Therefore, if an animal clamps onto the deicer 12, the animal is unable to remove the deicer 12 from the tank because the deicer 12 is securely anchored to the receptacle 10.

Alternatively, instead of being anchored to the receptacle 10, the anchoring assemblies described above may be secured or integrally formed with a heavy component, such as a concrete block, that is positioned within a liquid receptacle. The weight of the component is such that an animal is unable to easily and comfortably lift it.

Thus, embodiments of the present invention provide systems that ensure that a deicer remains within a liquid receptacle during operation. As such, livestock are prevented from removing the deicer from the receptacle.

While various spatial terms, such as upper, bottom, lower, mid, lateral, horizontal, vertical, and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A system for preventing a deicer from being removed from a liquid receptacle, the system comprising:
   a deicer comprising a main body and a heating element, said heating element being configured to heat liquid within the liquid receptacle;
   an anchoring assembly configured to be secured to or within the liquid receptacle, wherein said anchoring assembly comprises a drain plug configured to plug a drain of the liquid receptacle;

a tether having first and second ends, said first end being securely fastened to a portion of said deicer, and said second end being securely fastened to said anchoring assembly, wherein said anchoring assembly is configured to ensure that said deicer remains within the liquid receptacle; and an eye bolt secured to said drain plug, wherein said second end of said tether is securely tied to said eye bolt.

2. The system of claim 1, wherein said main body is configured to float or sink.

3. The system of claim 1, wherein said drain plug is configured to threadably secure to a wall of the liquid receptacle that defines the drain.

4. The system of claim 1, wherein said tether is formed of one of stainless steel braid, aluminum wire, plastic cable or monofilament.

5. The system of claim 1, wherein the liquid receptacle is a livestock water tank.

6. A system for preventing a deicer from being removed from a liquid receptacle, the system comprising:

a liquid receptacle comprising upstanding walls integrally connected to a base, said upstanding walls and said base defining a liquid-retaining volume, wherein a drain is formed through one of said upstanding walls proximate said base;

a deicer comprising a main body and a heating element, said heating element being configured to heat liquid within said liquid receptacle;

an anchoring assembly configured to be secured to or within said liquid receptacle, wherein said anchoring assembly comprises a drain plug configured to plug a drain of the liquid receptacle;

a tether having first and second ends, said first end being securely fastened to a portion of said deicer, and said second end being securely fastened to said anchoring assembly, wherein said anchoring assembly is configured to ensure that said deicer remains within said liquid receptacle: and an eye bolt secured to said drain plug, wherein said second end of said tether being securely tied to said eve bolt.

7. The system of claim 6, wherein said main body is configured to float or sink.

8. The system of claim 6, wherein said drain plug threadably secures into said drain.

9. The system of claim 6, wherein said tether is formed of one of stainless steel braid, aluminum wire, plastic cable or monofilament.

10. The system of claim 6, wherein said liquid receptacle is a livestock water tank.

11. A system for preventing a deicer from being removed from a liquid receptacle, the system comprising:

an anchoring assembly configured to be secured to or within the liquid receptacle, said anchoring assembly comprising a drain plug configured to plug a drain of the liquid receptacle and a fastening member secured to said anchoring assembly, said fastening member comprising a loop or a through-hole configured to securely attach to a tether that is secured to the deicer, wherein said fastening member comprises an eye bolt or a bolt having said through-hole formed through a shaft.

12. The system of claim 11, further comprising an adjustment slider slidably secured on said tether, said adjustment slider being configured to be adjusted to remove slack in said tether.

13. A system for preventing a deicer from being removed from a liquid receptacle, the system comprising:

a deicer comprising a main body and a heating element, said heating element being configured to heat liquid within the liquid receptacle;

an anchoring assembly configured to be secured to or within the liquid receptacle, wherein said anchoring assembly comprises a drain plug configured to plug a drain of the liquid receptacle;

a tether having first and second ends, said first end being securely fastened to a portion of said deicer, and said second end being securely fastened to said anchoring assembly, wherein said anchoring assembly is configured to ensure that said deicer remains within the liquid receptacle; and a bolt having a through-hole formed through a shaft, said bolt being secured to said drain plug, wherein said second end of said tether is looped through said through-hole.

14. The system of claim 13, further comprising a wing nut threadably engaging said shaft, wherein said wing nut is configured to cover a portion of said through-hole in order to securely pinch said second end of said tether within said through-hole.

15. The system of claim 13, further comprising an adjustment slider slidably secured on said tether, said adjustment slider being configured to be adjusted to remove slack in said tether.

16. A system for preventing a deicer from being removed from a liquid receptacle, the system comprising:

a deicer comprising a main body and a heating element, said heating element being configured to heat liquid within said liquid receptacle;

an anchoring assembly configured to be secured to or within said liquid receptacle, wherein said anchoring assembly comprises a drain plug configured to plug a drain of the liquid receptacle;

a tether having first and second ends, said first end being securely fastened to a portion of said deicer, and said second end being securely fastened to said anchoring assembly, wherein said anchoring assembly is configured to ensure that said deicer remains within said liquid receptacle; and a bolt having a through-hole formed through a shaft, said bolt being secured to said drain plug, wherein said second end of said tether is looped through said through-hole.

17. The system of claim 16, further comprising a wing nut threadably engaging said shaft, wherein said wing nut is configured to cover a portion of said through-hole in order to securely pinch said second end of said tether within said through-hole.

18. The system of claim 16, further comprising an adjustment slider slidably secured on said tether, said adjustment slider being configured to be adjusted to remove slack in said tether.

19. The system of claim 1, further comprising an adjustment slider slidably secured on said tether, said adjustment slider being configured to be adjusted to remove slack in said tether.

20. The system of claim 6, further comprising an adjustment slider slidably secured on said tether, said adjustment slider being configured to be adjusted to remove slack in said tether.

* * * * *